United States Patent
Shiino et al.

(10) Patent No.: US 8,993,917 B2
(45) Date of Patent: Mar. 31, 2015

(54) FABRICATION METHOD OF ELECTRODE FOR SPARK SURFACE MODIFICATION, AND SPARK SURFACE MODIFICATION ELECTRODE

(75) Inventors: Masayoshi Shiino, Tokyo (JP);
Hiroyuki Ochiai, Tokyo (JP);
Mitsutoshi Watanabe, Tokyo (JP);
Hiroki Yoshizawa, Tokyo (JP); Issei Otera, Tokyo (JP)

(73) Assignee: IHI Corporation, Tokyo (JP)

( * ) Notice: Subject to any disclaimer, the term of this patent is extended or adjusted under 35 U.S.C. 154(b) by 721 days.

(21) Appl. No.: 12/669,402

(22) PCT Filed: Jul. 16, 2008

(86) PCT No.: PCT/JP2008/062800
§ 371 (c)(1),
(2), (4) Date: Jan. 15, 2010

(87) PCT Pub. No.: WO2009/011355
PCT Pub. Date: Jan. 22, 2009

(65) Prior Publication Data
US 2010/0200548 A1    Aug. 12, 2010

(30) Foreign Application Priority Data
Jul. 18, 2007    (JP) ................................. 2007-187122

(51) Int. Cl.
*B23H 1/04* (2006.01)
*B22F 3/10* (2006.01)
*B23H 1/06* (2006.01)

(52) U.S. Cl.
CPC ............... *B23H 1/04* (2013.01); *B22F 3/1007* (2013.01); *B22F 3/1021* (2013.01); *B22F 2999/00* (2013.01); *B23H 1/06* (2013.01)

USPC ...................................... 219/69.15; 219/69.17

(58) Field of Classification Search
None
See application file for complete search history.

(56) References Cited

U.S. PATENT DOCUMENTS 3,290,124 A * 12/1966 Holtzclaw, Jr. ............... 428/566
3,303,559 A * 2/1967 Holtzclaw ........................ 419/23
(Continued)

FOREIGN PATENT DOCUMENTS

JP    52 70496    6/1977
JP    56 25906    3/1981
(Continued)

OTHER PUBLICATIONS

U.S. Appl. No. 13/392,326, filed Feb. 24, 2012, Yoshizawa et al.
(Continued)

*Primary Examiner* — David E Graybill
(74) *Attorney, Agent, or Firm* — Oblon, McClelland, Maier & Neustadt, L.L.P.

(57) ABSTRACT

A forming 7 die is filled with a powder (11) of electrode material, the powder (11) of electrode material filled in the forming die is compressed to form a porous powder compact (27), the porous powder compact (27) is set in place in a chamber (25) of a heat-treating furnace (23), the chamber (25) is supplied with inert gas or hydrogen gas, and inert gas or hydrogen gas is heated by heaters (39) in the heat-treating furnace (23) and blown toward the powder compact (27), as blows circulating in the chamber (25), whereby the powder compact is heated with heat of convection flows of inert gas or hydrogen gas, or mixed gas containing inert gas as principal component and hydrogen gas, so the electrode material of the powder compact is sintered.

3 Claims, 3 Drawing Sheets

(56) References Cited

U.S. PATENT DOCUMENTS

| | | | |
|---|---|---|---|
| 3,413,435 A * | 11/1968 | Holtzclaw | 219/69.15 |
| 4,115,623 A | 9/1978 | Padalko et al. | |
| 7,446,329 B2 * | 11/2008 | Bristol et al. | 250/504 R |
| 7,479,208 B2 * | 1/2009 | Bayer et al. | 204/224 M |
| 2008/0220278 A1 * | 9/2008 | Dopp | 428/550 |
| 2010/0200548 A1 * | 8/2010 | Shiino et al. | 219/69.15 |

FOREIGN PATENT DOCUMENTS

| | | | |
|---|---|---|---|
| JP | 7-138611 A | | 5/1995 |
| JP | 2002 370127 | | 12/2002 |
| RU | 2 271 263 C2 | | 7/2004 |
| SU | 348322 A | | 9/1972 |
| SU | 806338 A | | 2/1981 |
| SU | 1748942 A1 | | 7/1992 |
| WO | 99 58744 | | 11/1999 |
| WO | WO 2007129749 A1 * | | 11/2007 |

OTHER PUBLICATIONS

Office Action issued May 24, 2011, in Russian Patent Application No. 2010105238/02(007390) with English-language translation.
Office Action issued Dec. 27, 2011, in Russian Patent Application No. 2010105238/02(007390) with English-language translation.
Office Action issued May 29, 2012, in Russian Patent Application No. 2010105238/02(007390) with English-language translation.
S. S. Kiparisov, et al., Equipment of Powder Metallurgy Factories, Moscow, Metallurgy, Publisher 1988, p. 316 (with English translation).
S. S. Kiparisov, et al., "Powder Metallurgy", Moscow, Metallurgy, Publisher 1980, p. 347 (with English translation).

* cited by examiner

FABRICATION METHOD OF ELECTRODE FOR SPARK SURFACE MODIFICATION, AND SPARK SURFACE MODIFICATION ELECTRODE

TECHNICAL FIELD

The present invention relates to a fabrication method of fabricating a porous electrode for spark surface modification, and a spark surface modification electrode fabricated by the fabrication method.

BACKGROUND ART

There are spark surface modification-oriented porous electrodes employed for spark surface modification using electric discharge energy. The patent document 1 below has disclosed a fabrication method of electrode for spark surface modification, as follows:

That is, a powder of electrode material is prepared with wax admixed as a binder, and the powder of electrode material is filled in a forming die. Next, the powder of electrode material filled in the forming die is compressed with compression forces of rams in a press machine, to form a porous powder compact. Then, the powder compact is set in place in a vacuum furnace as a heat-treating facility, and the chamber in vacuum furnace is heated, vaporizing wax as left admixed in the powder compact to remove, performing evacuation of the chamber in vacuum furnace to a prescribed vacuum. And, the powder compact is heated up by radiation heat from heaters in the vacuum furnace, to provide a sintered powder compact of electrode material. It is noted that when sintering the powder compact of electrode material, wax is still vaporized to remove from the powder compact.

There is a spark surface modification electrode that can be fabricated by the foregoing.

Patent document 1: WO 99/58744

DISCLOSURE OF INVENTION

However, as a powder compact of electrode material is heated by radiation heat from heaters in a vacuum furnace, when sintering the powder compact, the sintering of electrode material is to well progress within those regions which are close to surfaces of the powder compact, with the surfaces inclusive, except for those (inner) regions which are distant from the powder compact surfaces, where the powder compact, that is porous and endowed with small coefficients of thermal conductivity, has lower temperatures, with tendencies for the sintering of electrode material to hardly go on. Therefore, in those cases in which thick electrodes are fabricated for spark surface modification, there may be variations in progress rate of sintering in powder compact of electrode material, that is, among binding forces of electrode material in powder compact, with a resultant failure to provide a stable quality of electrode for spark surface modification.

Accordingly, it is an object of the present invention to provide a fabrication method of electrode for surface modification, and a spark surface modification electrode fabricated by the fabrication method, permitting the above-noted issue to be solved.

According to an aspect of the present invention, there is a fabrication method of fabricating a porous electrode for spark surface modification employable for use of electric discharge energy to make a spark surface modification, the fabrication method comprising a first fabrication step of filling a forming die with a powder of electrode material, a second fabrication step of following a completion of the first fabrication step, compressing the powder of electrode material filled in the forming die, to form a porous powder compact, a third fabrication step of following a completion of the second fabrication step, having the powder compact set in place in a chamber of a heat-treating furnace, and the chamber supplied with one of inert gas, hydrogen gas, and mixed gas containing inert gas as principal component and hydrogen gas, and a fourth fabrication step of following a completion of the third fabrication step, heating the powder compact with heat of convection flows of inert gas, hydrogen gas, or mixed gas containing inert gas as principal component and hydrogen gas being heated by a heater in the heat-treating furnace and passing through the powder compact, sintering the electrode material of the powder compact.

It is noted that the powder of electric material refers to a powder of metal (with alloy inclusive), powder of ceramics, or mixed powder in between, as it is selective as an adequate powder of electrode material in accordance with the type of spark surface modification.

BEST MODE FOR CARRYING OUT THE INVENTION

There will be described embodiments of the present invention with reference to FIG. 1 to FIG. 4. It is noted that in the figures, designated at "U" is an upward direction, and "D", a downward direction.

Figure 4:
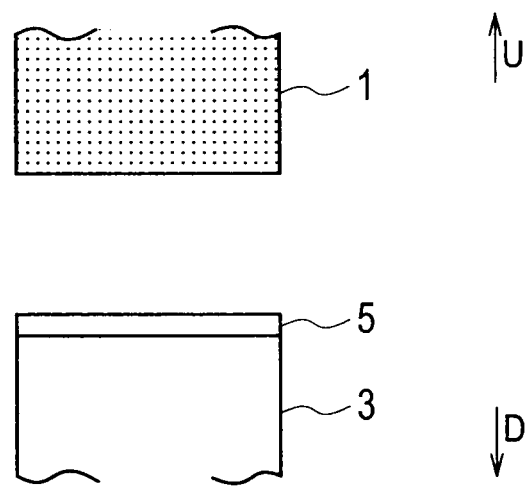
FIG. 4 is a schematic diagram describing a surface modification using a spark surface modification electrode.

Referring to FIG. 4, there is a spark surface modification electrode (in the form of a coding block CB) 1 according to an embodiment of the present invention, that is illustrated as a porous electrode fabricated by a fabrication method of spark surface modification electrode according to an embodiment of the present invention, and adapted for use of electric discharge energy to implement a spark surface modification. The spark surface modification electrode 1 is made of an alloy of stellite family or a metal composite containing a stellite alloy as a principal component (referred herein to as a stellite alloy or the like). The spark surface modification electrode 1 is configured to use for a spark surface modification of a piece of work (as an object to be modified) 3, onto a to-be-modified surface thereof, to form thereon a wear-resistant protective coat 5.

Figure 1:
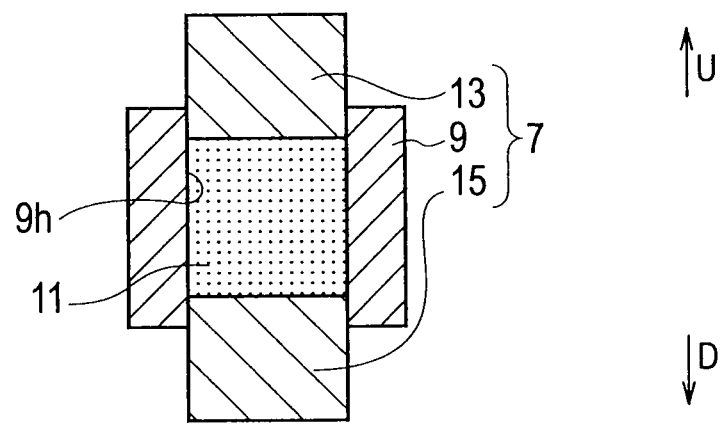
FIG. 1 is a diagram describing a forming die in conjunction with a first fabrication step of a fabrication method of spark surface modification electrode according to an embodiment of the present invention.

Referring to FIG. 1, there is illustrated a forming die 7 employed for the fabrication method of spark surface modification electrode according to the embodiment of the present invention, which comprises a tubular die 9 that has a die cavity 9h configured to accommodate a powder 11 of stellite alloy or the like as an electrode material. Further, it has an upper punch 13 provided to be vertically movable at the upper end of the die cavity 9h, and a lower punch 15 provided to be vertically movable at the lower end of the die cavity 9h.

Figure 2:
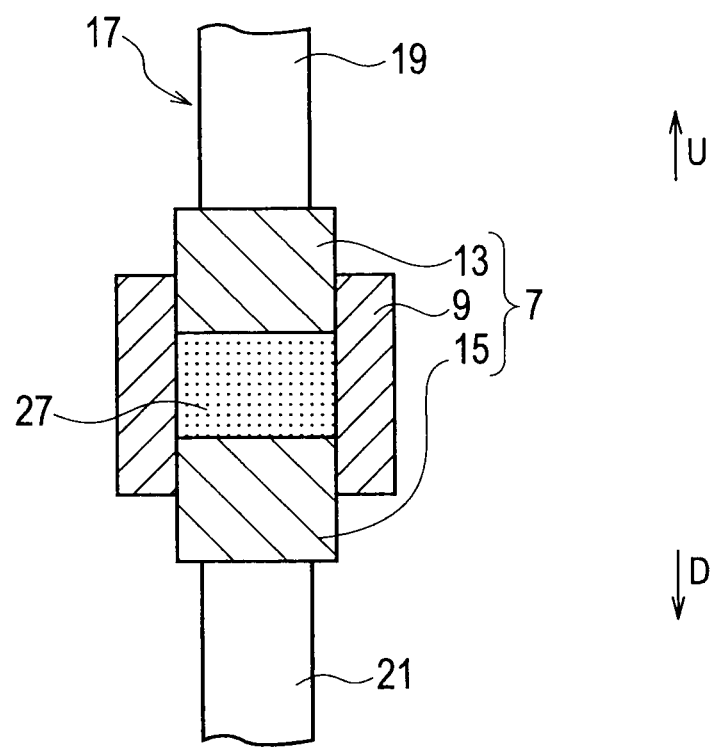
FIG. 2 is a diagram describing a press machine in conjunction with a second fabrication step of the fabrication method of spark surface modification electrode according to the embodiment of the present invention.

Referring to FIG. 2, there is illustrated a press machine 17 employed for the fabrication method of spark surface modification electrode according to the embodiment of the present invention, which includes a combination of an upper ram 19 and a lower ram 21 vertically opposing each other, the upper ram 19 being vertically movable relative to the lower ram 21 by operation of a hydraulic cylinder (not shown). It is noted that the combination of upper ram 19 and lower ram 21 is configured to set the forming die 7 in between.

Figure 3:
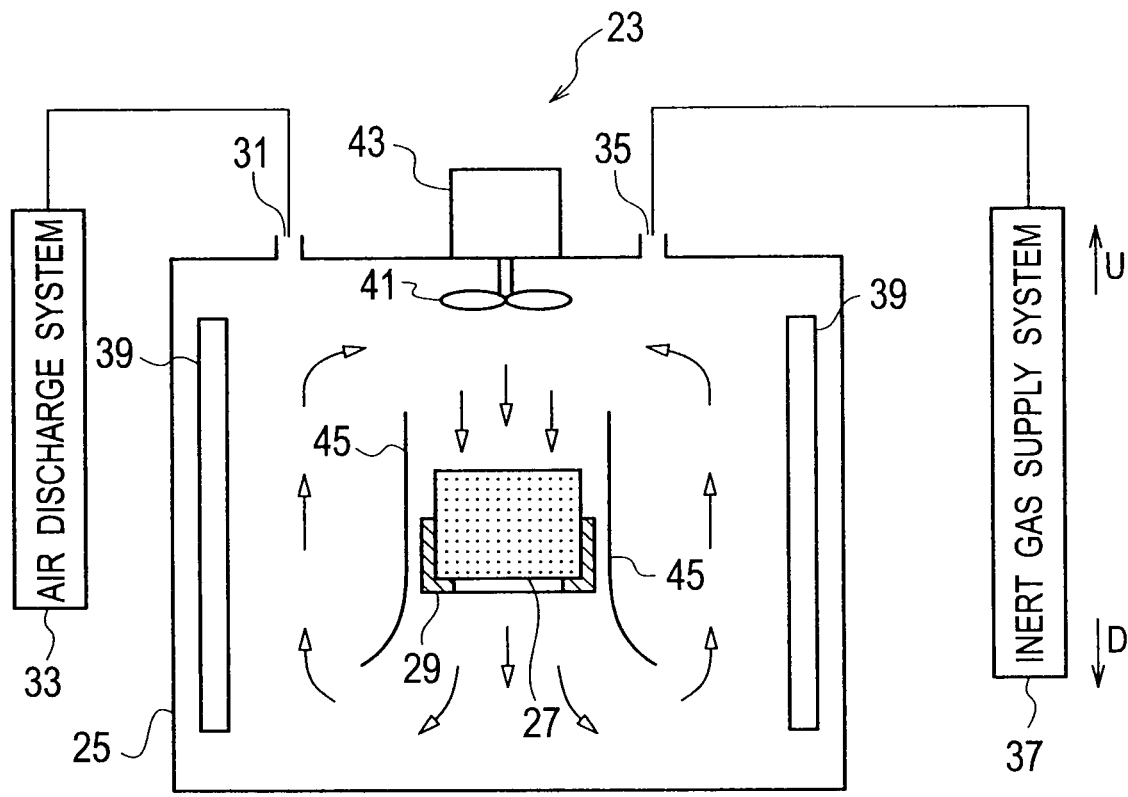
FIG. 3 is a diagram describing a heat-treating furnace in conjunction with a third and a fourth fabrication step of the fabrication method of spark surface modification electrode according to the embodiment of the present invention.

Referring to FIG. 3, there is illustrated a heat-treating furnace 23 employed for the fabrication method of spark surface modification electrode according to the embodiment of the present invention, which includes a chamber 25 that has therein a setting jig 29 provided for setting a porous powder compact 27 formed from a powder 11 of electrode material. The chamber 25 has a discharge port 31 provided at the top, the discharge port 31 being connected to an air discharge system 33 for discharging air. Further, the chamber 25 has a supply port 35 provided at the top, the supply port 35 being connected to an inert gas supply system 37 for supplying inert gas.

The chamber 25 has a plurality of heaters 39 annularly arranged therein for heating inert gas. There is a fan 41 fixed to a top portion of the chamber 25, and adapted for rotation to send inert gas to circulate, and a fan motor 43 installed on a central part of the top of chamber 25, for driving the fan 41 into rotation. The chamber 25 has a plurality of guide plates 45 positioned therein as necessary for guiding flows of inert gas sent for circulation.

Description is now made of a fabrication method of spark surface modification electrode according to an embodiment of the present invention.

According to the embodiment of the present invention, the fabrication method of spark surface modification electrode is described as a fabrication method of fabricating a spark surface modification electrode 1, that includes a first fabrication step, a second fabrication step, a third fabrication step, and a fourth fabrication step. The fabrication steps will be each specifically described.

(First Fabrication Step)

Referring to FIG. 1, there is a powder 11 of stellite alloy or the like as an electrode material prepared with wax admixed as a binder, the powder 11 of electrode material being filled in the die cavity 9h of die 9 (in the forming die 7). It is noted that the powder 11 of stellite alloy or the like may be substituted with a powder of different metal (with alloy inclusive), a powder of ceramics, or a powder mixture in between to be used as an electrode material.

(Second Fabrication Step)

Referring to FIG. 2, as the first fabrication step is completed, the forming die 7 is set in position between the upper ram 19 and the lower ram 21 in the press machine 17. Then, by operation of a hydraulic cylinder, the upper ram 19 is moved downward relative to the lower ram 21, exerting pressures of the upper ram 19 and the lower ram 21 on, thus compressing, the powder 11 of electrode material filled in the forming die 7, to thereby form a porous powder compact 27. Further, by operation of the hydraulic cylinder, the upper ram 19 is moved upward relative to the lower ram 21, to remove the porous powder compact 27 from inside the forming die 7.

(Third Fabrication Step)

Referring to FIG. 3, as the second fabrication step is completed, the porous powder compact 27 is set to the setting jig 29 in the heat-treating furnace 23. Then, the chamber 25 of the heat-treating furnace 23 is evacuated to a predetermined vacuum by the air discharge system 33. And, the chamber 25 is supplied with an inert gas by the inert gas supply system 37. The inert gas is one of argon gas, helium gas, and nitrogen gas. It is noted that the inert gas supplied to the chamber 25 may be substituted with a hydrogen gas, or a mixed gas containing an inert gas as a principal component and a hydrogen gas. The hydrogen gas is admixed to the inert gas for control of a redox reaction of the powder compact 27 in the chamber 25. If the chamber 25 were simply supplied with an inert gas, the powder compact 27 might have been oxidized at some concentrations of oxygen in the chamber 25. This can be avoided by mixing hydrogen to inert gas, changing an atmosphere in the chamber 25 to a high-reducible (reduction-promoting) atmosphere. Further, there may be provision of a high purification device for removing moisture, oxygen, etc between the inert gas supply system and the chamber 25, to prevent oxidation at the lower temperatures.

(Fourth Fabrication Step)

After completion of the third fabrication step, admixed wax in the powder compact 27 is vaporized to remove, little by little, by heating, to raise the temperature, giving it time. Wax-containing gases are then discharged, while supplying an inert gas. The removal of wax is followed by a temperature-rise to a sintering temperature, along which in the heat-treating furnace 23 the fan motor 43 is driven to rotate the fan 41, whereby flux of inert gas heated by the heaters 39 in the heat-treating furnace 23 is caused to flow toward the porous powder compact 27, as it is guided for circulation in the chamber 25. In this manner, the powder compact 27 is heated by heat of convective flows of inert gas, so that the electrode material of powder compact 27 can be sintered.

There will be described functions and effects in embodiment examples of the present invention.

Figure 5:
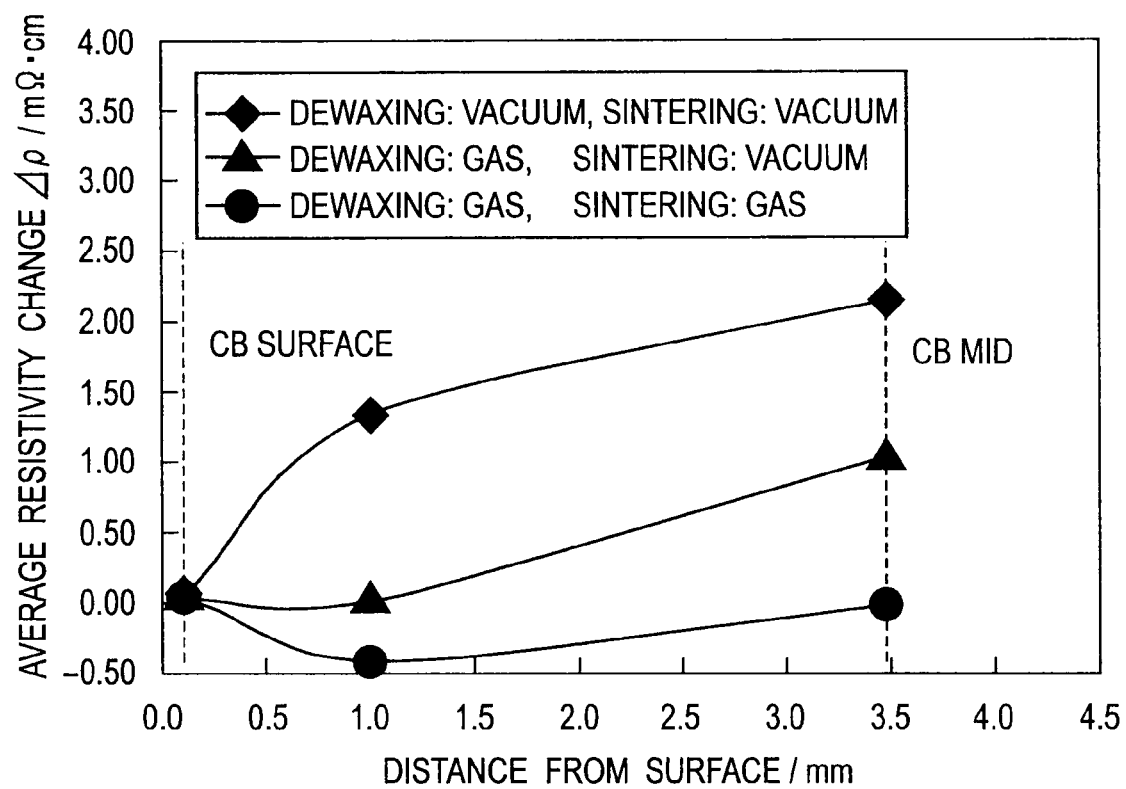
FIG. 5 is a graph showing results of comparison among sintering tests under various atmospheres.

FIG. 5 shows results of comparison among coating blocks (as spark surface modification electrodes) CB that were sintered by employing the above-noted fabrication method under various atmospheres. In FIG. 5, the axis of abscissa represents a depth in terms of a distance from a surface of each coating block CB, and the axis of ordinate represents a binding force in terms of an average resistivity change of electrode material of the coating block CB. It means that the greater value the ordinate axis has, the stronger the degree of bond in the electrode material becomes. Further, identified by each square in the graph is a result of an example in which the fourth fabrication step had a de-waxing process and a sintering process both implemented under vacuum atmosphere, each triangle in the graph is a result of an example in which the fourth fabrication step had a de-waxing process implemented under inert gas atmosphere and a sintering process implemented under vacuum atmosphere, and each round in the graph is a result of an example in which the fourth fabrication step had a de-waxing process and a sintering process both implemented under inert gas atmosphere. As is apparent from the figure, it was the case in which both de-waxing process and sintering process were implemented under inert gas atmosphere that made an even distribution of binding forces in electrode material reaching inside coating block CB. In other words, it has turned out that in a mode of implementation including a combination of de-waxing process and sintering process both under inert gas atmosphere, resultant spark surface modification electrodes tend to have a reduced variation with respect to binding forces of electrode material.

For the electrode material of a porous powder compact 27 to be sintered, flux of inert gas is heated by the heaters 39 and sent toward the porous powder compact 27, to flow in the chamber 25 in a circulating manner, whereby convective flows of inert gas are forced through the porous powder compact 27, with their heat heating the powder compact 27, which allows, under sufficient suppression of chemical reactions of electrode material in the powder compact 27, for a well-promoted sintering not simply at regions of electrode material close to surfaces of the powder compact 27 (with the surfaces of powder compact 27 inclusive), but also at (internal) regions of electrode material distant from the surfaces of powder compact 27.

Therefore, according to this mode of embodiment of the present invention, there is the ability to achieve a well-promoted sintering not simply at regions of electrode material within vicinities of surfaces of a powder compact 27, but also at regions of electrode material distant from surfaces of the powder compact 27, which permits, even in fabrication of a thick electrode 1 for spark surface modification, a reduced variation to be observed in the degree of progress with respect to the sintering of electrode material of powder compact 27, that is, the binding force in electrode material of powder compact 27, thus allowing for a sufficient enhancement in quality of the spark surface modification electrode 1.

It is noted that the present invention is in no way restricted to the foregoing modes of embodiment, and may be implemented in a variety of embodiment modes else. Further, the present invention covers a claimed range without restriction to those modes of embodiment.

INDUSTRIAL APPLICABILITY

As will be seen from the foregoing description, according to the present invention, it is possible to achieve a well-promoted sintering not simply at regions of electrode material within vicinities of surfaces of a powder compact, but also at regions of electrode material distant from surfaces of the powder compact, thus permitting, even in fabrication of a thick electrode for spark surface modification, a reduced variation to be observed in the degree of progress with respect to the sintering of electrode material of the powder compact, that is, the binding force in electrode material of the powder compact, allowing for a sufficient enhancement in quality of the spark surface modification electrode.

The invention claimed is:

1. A fabrication method of fabricating a porous electrode for spark surface modification employable for use of electric discharge energy to make a spark surface modification, the fabrication method comprising:
    a first fabrication step of filling a forming die with a powder of electrode material;
    a second fabrication step, following completion of the first fabrication step, of compressing the powder of electrode material filled in the forming die, to form a porous powder compact;
    a third fabrication step, following completion of the second fabrication step, of having the powder compact set in place in a chamber of a heat-treating furnace, and the chamber supplied with mixed gas containing inert gas as principal component and hydrogen gas; and
    a fourth fabrication step, following completion of the third fabrication step making the heated gas heated by a heater in the heat-treating furnace circulate in the chamber to generate the convection flows, heating the powder compact with the convection flows of the heated gas, and thereby sintering the electrode material of the powder compact by making the heated gas pass through the powder compact,
    wherein the fourth fabrication step comprises: evaporating wax mixed in the powder compact for removal of the wax; and blowing the heated gas toward the powder compact sufficiently for the heated gas to penetrate the powder compact, thereby heating the inside of the powder compact.

2. The fabrication method of spark surface modification electrode according to claim 1, wherein the inert gas comprises one of argon gas, helium gas, and nitrogen gas.

3. A spark surface modification electrode fabricated by the fabrication method of spark surface modification electrode according to claim 1,
    wherein the average resistivity change has values within 1 mΩ/cm and is homogeneous from the surface of the center in depth.

* * * * *